United States Patent Office 3,524,839
Patented Aug. 18, 1970

---

3,524,839
POLYMERS AND COPOLYMERS OF ALLYL FLUORIDE
Simona Margulis, Kiryat Haim, and Leonard M. Shorr, Romema, Haifa, Israel, assignors to Israel Mining Industries-Institute for Research and Development, Haifa Bay, near Ir Ganim, Israel, a company of Israel
No Drawing. Filed Dec. 27, 1966, Ser. No. 604,655
Claims priority, appplication Israel, Feb. 7, 1966, 25,131
Int. Cl. C08f 3/32, 15/34, 1/78
U.S. Cl. 260—92.1
7 Claims

ABSTRACT OF THE DISCLOSURE

There are provided homopolymers and copolymers of allyl fluoride in which the fluorine content is at least 85% of the theory. The theoretical fluorine content of such a homopolymer or copolymer is that which follows from the theoretical number of allyl fluoride monomers per molecule of the polymer.

---

The present invention concerns polymers and copolymers of allyl fluoride which are novel compounds. It has been found that the novel polymers and copolymers according to the invention have various valuable properties such as good resistance against acids and fats and they thus have a large variety of industrial and commercial applications.

All attempts carried out hitherto for the polymerization or copolymerization of allyl fluoride have been unsuccessful. Thus S. Murahashi, S. Nozakura and K. Hatada report in Bull. Chem. Soc. Japan 34, 631 (1961) that attempts to polymerize allyl fluoride using Ziegler type catalysts were unsuccessful, the fluorine in the product being only from 1 to 3% instead of the theoretical content of 31.6%. Also infra-red spectra indicated the highly unsaturated structure of the products obtained resulting from the dehydrofluorination which occurred.

There have also been some reports of allylic polymers containing both combined chlorine and fluorine. Thus in U.S. patent specification 2,486,923 there is described a two-stage process in which allyl chloride is at first polymerized in the presence of a peroxide serving as initiator and is then further polymerized in the presence of hydrogen fluoride. Towards the end of the second stage, the temperature is raised to above 300° C. It is stated in that patent that the hydrogen fluoride acts as a polymerization catalyst and in addition a substantial amount of HF enters into chemical combination to give a product containing combined fluorine as well as combined chlorine. It is also mentioned in the patent that hydrogen chloride is evolved and this proves the occurrence of a dehydrohalogenation reaction which generally occurs during the polymerization of allyl halide with an ionic-type catalyst. It seems therefore that in the process according to the above U.S. patent the fluorine enters the polymer by subsequent addition of HF at the unsaturation sites. However, such a succession of reactions cannot lead to a true polyallyl structure, since by the addition of HF the fluorine will not always enter the allylic position (according to the Markovnikov rule).

It can thus be positively stated that in the process according to U.S. Pat. 2,486,923 there does not occur a substitution of fluorine for chlorine during the reaction since HF alone, or even in the presence of a catalyst is unable to replace a lone chlorine atom in primary, secondary or tertiary chloro compounds. In line therewith U.S. patent specification 2,486,923 does in fact not describe any compound which purports to be polymeric or copolymeric allyl fluoride and merely mentions polymers containing combined chlorine and fluorine.

The present invention provides for the first time as novel products polymers and copolymers of allyl fluoride in which the fluorine content is at least 85% of the theory.

The theoretical fluoride content of homopolyallyl fluoride is 31.5% by weight. Homopolymerized allyl fluoride according to the present invention will thus contain at least about 28% by weight of fluorine and the content is generally even closer to the theoretical one.

Where the fluorinated polymers of this invention are copolymers containing allyl fluoride the fluorine units content will again be at least 85% of the theoretical content of the particular copolymer i.e., the polymer will contain at least 85% of allyl fluoride units of the total quantity of allyl fluoride monomer which enters the polymerization. For example, the theoretical fluorine content of a copolymer of allyl fluoride units and vinyl acetate units containing 78% by weight of allyl fluoride units and 22% by weight of vinyl acetate units, is 24.7% by weight. Consequently such a copolymer according to the present invention will contain at least about 22% by weight of fluorine as allyl fluoride units.

The novel polymers and copolymers according to the invention may be prepared by polymerization or copolymerization of allyl fluoride in the presence of an initiator selected from the group of azo-compounds of the general formula

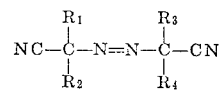

in which $R_1$, $R_2$, $R_3$ and $R_4$ are each a hydrocarbon radical.

From among this group azo-isobutyronitrile, which will be referred to hereinafter for short as AIBN and whose formula is

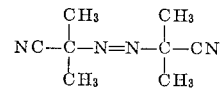

has been found particularly suitable.

It has also been found that in some instances it is advantageous to employ in addition photo excitation. Wavelengths of the order of 3000–5000 A. have been found suitable for this purpose.

The invention is illustrated by the following examples to which it is not limited.

EXAMPLE 1

Preparation of allyl fluoride monomer

The allyl fluoride was prepared by the known method described by F. W. Hoffmann, J. Org. Chem. 14, 105–10 (1949) from allyl chloride and potassium fluoride in diethylene glycol.

50 g. (0.86 mole) of finely powdered anhydrous KF and 35 g. of diethylene glycol were heated in a 250 ml. three neck, round bottomed flask, and fitted with mechanical stirring, dropping funnel, two consecutive ice-water ascendant condensers with attached receiver ($CO_2$-acetone). To the vigorously stirred reaction mixture, there was added a solution of 36.5 g. allyl chloride (0.48 mole) in 26 g. diethylene glycol during four hours at such a rate that the liquefiable vapours did not rise beyond half the height of the first condenser. Approximately 17 cc. of liquid material collected in the $CO_2$-acetone trap. The reaction product had a specific gravity of approximately 0.8 g./ml. The crude monomer was after that purified by fractional distillation in an 80 cm. vacuum jacket column filled with glass helices and insulated with foamed polystyrene—the still head being provided with a $CO_2$-acetone cooled condenser. The allyl fluoride was stored in glass pressure tubes under dry nitrogen.

EXAMPLE 2

Polymerization of allyl flouride

The polymerization runs were performed in glass pressure tubes of total volume 60 ml. sealed by a pressure valve. The reaction tube in which 2% by weight of AIBN was introduced after previous sweeping with dry nitrogen, was cooled in $CO_2$-acetone and 5 ml. of allyl fluoride was then distilled into it at atmospheric pressure and exclusion of moisture. Before sealing the tube, dry nitrogen was again passed through it. The tubes were immersed in a constant water bath at 65–70° C. for 100 hours. At the end of the reaction time, the reaction tube was opened and the unreacted monomer recovered by distillation of the gases into a $CO_2$-acetone cooled trap. The polymeric product contained 28.9% F. No acidic vapours were detected in the reaction mixture, which indicated that dehydrofluorination did not occur. The infra-red analysis proved the existence of the polyallyl fluoride structure as well as the presence of nitrile groups. This proves that some of the initiator goes over into the product and remains there as contaminant, which accounts for the fact that the fluorine content is somewhat below the theoretical value.

EXAMPLE 3

Co-polymerization of allyl fluoride with vinyl acetate 0.1 g. of AIBN and 1 g. of freshly distilled vinyl acetate were introduced into a glass pressure tube of 60 ml. volume. The tube was swept with dry nitrogen and cooled in a $CO_2$-acetone bath. Approximately 5 ml. (4 g.) of pure allyl fluoride were distilled into the tube. After again sweeping with nitrogen the tube was sealed and heated at 75–80° for 100 hours. After cooling, the unreacted allyl fluoride was distilled out, first at room temperature, then by heating the reaction product up to 80° C. under vacuum and trapping the volatiles in $CO_2$-acetone. The remaining yellow viscous resin was analysed by infra-red spectroscopy in a chloroform solution which confirmed the presence of both polymerized allyl fluoride and vinyl acetate moieties. Its fluorine content was 26.0% thus corresponding to a copolymer composition of 82% by weight allyl fluoride and 18% by weight vinyl acetate.

EXAMPLE 4

18.5 ml. of a solution of freshly distilled liquid vinyl chloride and allyl fluoride (in a volume ratio of approximately 10:1) containing 0.05 g. of AIBN was maintained at 65° C. for 6.5 hours in a glass pressure tube. Five grams of solid white polymer, containing 52.4% by weight of bound chlorine and 2.2% by weight of bound fluorine were thus produced. The ratio of unreacted monomers recovered from the reaction mixture, as determined by gas chromatographic analysis, was not different from that of the original reagent mixture. The copolymer composition was calculated to be 92.6% by weight vinyl chloride and 7.4% by weight allyl fluoride.

We claim:

1. A polymer of allyl fluoride containing at least 85% allyl fluoride units.

2. A copolymer of allyl fluoride containing in the polymer chain a number of allyl fluoride units equal to at least 85% of the total quantity of allyl fluoride monomer entering the polymerization reaction.

3. A method of producing polymers according to claim 2, wherein allyl fluoride is polymerized in the presence of an initiator selected from the group of azo-compounds of the general formula

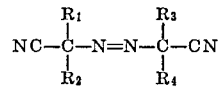

in which $R_1$, $R_2$, $R_3$ and $R_4$ are each a hydrocarbon radical.

4. The method according to claim 3, wherein said initiator is azo-isobutyronitrile.

5. The method according to claim 3, wherein photo excitation is employed in addition to said initiator.

6. A method in accordance with claim 3 wherein said polymerization is carried out in the absence of water.

7. A method in accordance with claim 3 wherein photo excitation of wavelength of 3,000–5,000 A. is used to assist the polymerization.

References Cited

UNITED STATES PATENTS

| | | | |
|---|---|---|---|
| 2,464,062 | 3/1949 | Strain | 260—92.1 |
| 2,471,959 | 5/1949 | Hunt | 260—92.1 |
| 3,098,844 | 7/1963 | Polishuk | 260—92.1 |
| 3,245,969 | 4/1966 | Reding et al. | 260—92.1 |

JOSEPH L. SCHOFER, Primary Examiner

J. A. DONAHUE, JR., Assistant Examiner

U.S. Cl. X.R.

260—87.1, 87.5